US012718554B2

(12) United States Patent
Wang et al.

(10) Patent No.: US 12,718,554 B2
(45) Date of Patent: Aug. 25, 2026

(54) DETECTING ELECTRICAL GRID ASSETS

(71) Applicant: X Development LLC, Mountain View, CA (US)

(72) Inventors: Xin-Jing Wang, Mountain View, CA (US); Anthony Ha, Milpitas, CA (US); Sze Mei Cat Wong, Johns Creek, GA (US); Reuben Nahouraii, Sunnyvale, CA (US); Arthur Robert Pope, Palo Alto, CA (US); Om Prakash Ravi, Sammamish, WA (US)

(73) Assignee: X Development LLC, Mountain View, CA (US)

( * ) Notice: Subject to any disclaimer, the term of this patent is extended or adjusted under 35 U.S.C. 154(b) by 416 days.

(21) Appl. No.: 18/226,716

(22) Filed: Jul. 26, 2023

(65) Prior Publication Data

US 2025/0037453 A1 Jan. 30, 2025

(51) Int. Cl.

*G06V 20/10* (2022.01)
*G06T 7/70* (2017.01)
*G06V 10/774* (2022.01)

(52) U.S. Cl.

CPC .............. *G06V 20/176* (2022.01); *G06T 7/70* (2017.01); *G06V 10/7753* (2022.01); *G06T 2207/20081* (2013.01); *G06T 2207/30184* (2013.01)

(58) Field of Classification Search

CPC . G06T 2207/20081; G06T 2207/20084; G06T 7/70; G06T 2207/30184;

(Continued)

(56) References Cited

U.S. PATENT DOCUMENTS 10,972,649 B2 4/2021 Casey et al.
11,126,843 B2 9/2021 Stahlfeld (Continued)

FOREIGN PATENT DOCUMENTS

| AU | 2019226185 | 9/2019 |
|---|---|---|
| CN | 106441233 | 3/2019 |
| CN | 111311967 | 6/2020 |

OTHER PUBLICATIONS

Team, The Quiq. âSemi-Supervised Learning Explained (with Examples). â Quiq, Aug. 14, 2025, quiq.com/blog/semi-supervised-learning-explained-with-examples/. (Year: 2023).*

(Continued)

*Primary Examiner* — Sumati Lefkowitz
*Assistant Examiner* — Connor L Hansen
(74) *Attorney, Agent, or Firm* — Fish & Richardson P.C.

(57) ABSTRACT

Methods, systems, and apparatus, including computer programs encoded on a storage device, for mapping an electrical grid are disclosed. A method includes sampling multiple locations within a geographic region, executing a detection process for each location, the detection process including applying the set of images for the location as input to a machine learning (ML) model that is trained to identify electrical grid assets depicted within images taken from a combination of different perspectives and obtaining an output from the machine learning model that indicates whether a same electrical grid asset is identified in each of the images of the location. In response to an ML output that indicates a positive identification of the same electrical grid asset being depicted in a particular set of images of a particular location, the method further includes: selecting a number of sublocations within the region, and executing the detection process for each sublocation.

19 Claims, 8 Drawing Sheets

(58) Field of Classification Search

CPC ........... G06T 17/05; G06T 2207/10032; G06T 7/174; G06F 18/2155; G06V 10/7753; G06V 20/70; G06V 10/82; G06V 10/774; G06V 20/176; G06V 10/7715; G06V 20/182

See application file for complete search history.

(56) References Cited

U.S. PATENT DOCUMENTS

| | | | |
|---|---|---|---|
| 11,152,785 B1 | 10/2021 | Stahlfeld et al. | |
| 11,580,728 B2 | 2/2023 | Gupta et al. | |
| 11,954,907 B2 | 4/2024 | Gupta et al. | |
| 2017/0053538 A1 | 2/2017 | Samarasekera et al. | |
| 2020/0242373 A1 | 7/2020 | Mei et al. | |
| 2021/0407187 A1 | 12/2021 | Gupta et al. | |
| 2022/0335669 A1 | 10/2022 | Stahlfeld et al. | |
| 2022/0366684 A1* | 11/2022 | Ales | H04L 67/12 |
| 2023/0206584 A1* | 6/2023 | Jin | G06V 20/17 382/103 |

OTHER PUBLICATIONS

Nassar, Ahmed Samy, SÃ© bastien LefÃ¨vre, and Jan Dirk Wegner. "Multi-view instance matching with learned geometric soft-constraints." ISPRS International Journal of Geo-Information 9.11 (2020): 687. (Year: 2020).*

Nassar, Ahmed Samy, SÃbastien LefÃvre, and Jan Dirk Wegner. "Multi-view instance matching with learned geometric soft-constraints." ISPRS International Journal of Geo-Information 9.11 (2020): 687. (Year: 2020).*

Team, The Quiq. "Semi-Supervised Learning Explained (with Examples)" Quiq, Aug. 14, 2025, quiq.com/blog/semi-supervised-learning-explained-with-examples/. (Year: 2023).*

Huang et al., "GridTracer: Automatic Mapping of Power Grids using Deep Learning and Overhead Imagery," CoRR, Submitted on Jan. 16, 2021, arXiv:2101.06390v1, 14 pages.

Jalil et al., "Fault Detection in Power Equipment via an Unmanned Aerial System Using Multi Modal Data," Sensors, Jul. 2019, 19(13), 3014, 15 pages.

Jalil et al., "Multimodal image analysis for power line inspection", Proceedings of the International Conference on Pattern Recognition and Artificial Intelligence, 2018, 592-596.

Koch et al., "The TUM-DLR Multimodal Earth Observation Evaluation Benchmark," 2016 IEEE Conference on Computer Vision and Pattern Recognition Workshops (CVPRW), 2016, 19-26.

Krylov et al., "Automatic Discovery and Geotagging of Objects from Street View Imagery," CoRR, Submitted on Aug. 28, 2017, arXiv:1708.08417v1, 10 pages.

Sampedro et al., "A Supervised Approach to Electric Tower Detection and Classification for Power Line Inspection," 2014 International Joint Conference on Neural Networks (IJCNN), Jul. 2014, 1970-1977.

Wilson et al., "Image and Object Geo-localization," CoRR, Submitted on Oct. 11, 2023, arXiv:2112.15202v2, 52 pages.

Zhou et al., "A Comprehensive Survey for Deep-Learning-Based Abnormality Detection in Smart Grids with Multimodal Image Data," Appl. Sci., May 2022, 12(11), 5336, 25 pages.

[No Author Listed] "UCL: Unsupervised Curriculum Learning for Utility Pole Classification from Aerial Imagery," 2022 International Conference on Digital Image Computing: Techniques and Applications (DICTA), Nov. 30, 2022, pp. 1-9.

International Search Report and Written Opinion in International Appln. No. PCT/US2024/039572, dated Oct. 16, 2024, 16 pages.

Lefevre et al., "Towards seamless multi-view scene analysis from satellite to street-level," Proceedings of the IEEE, May 23, 2017, 32 pages.

* cited by examiner

DETECTING ELECTRICAL GRID ASSETS

BACKGROUND

Utility companies typically do not have up-to-date data on how many electrical grid assets, such as power poles, are located in their electrical grids, or data on where those electrical grid assets are located, which can make modeling, maintaining, and responding to disturbances in an electrical grid more difficult.

SUMMARY

This specification relates to detecting electrical grid assets, such as power poles, in an electrical grid.

In general, the disclosure relates to a process and system for power pole detection and localization through images. Power poles, also known as electric poles, can be detected from overhead images, ground-level images, and oblique images, for example. However, different types of imagery, such as images taken from different perspectives, include different information and metadata. For example, overhead images typically include accurate latitude and longitude information, but have a low resolution for poles. Ground-level images typically have a high resolution for poles, but usually lack latitude and longitude information. Oblique images typically have higher resolution than an overhead image and can provide multiple views of the same pole, but usually lack information on the latitude and longitude of the pole. Thus, imagery-based power pole detection can be improved by using more than one type of image.

In general, innovative aspects of the subject matter described in this specification can be embodied in methods that include the actions of sampling multiple locations within a geographic region by obtaining a set of images of each location, each set of images including at least one image of the location from a first perspective, at least one image of the location from a second perspective, and at least one image of the location from a third perspective; executing a detection process for each location, the detection process including applying the set of images for the location as input to a machine learning (ML) model that is trained to identify electrical grid assets depicted within images taken from a combination of different perspectives and obtaining an output from the machine learning model that indicates whether a same electrical grid asset is identified in each of the images of the location; in response to an ML output that indicates a positive identification of the same electrical grid asset being depicted in a particular set of images of a particular location: selecting a number of sublocations within the region, and executing the detection process for each sublocation. Each sublocation can cover a different area of the region near the particular location.

Other implementations of this aspect include corresponding systems, apparatus, and computer programs, configured to perform the actions of the methods, encoded on computer storage devices.

These and other implementations can each optionally include one or more of the following features.

In some implementations, the electrical grid asset includes any one of: electric poles, power towers, or components on electric poles or power towers.

In some implementations, the method further includes determining a search vector along which the number of sublocations are selected. In some implementations, determining the search vector includes: selecting first sublocations within a predefined radius of the particular location; executing the detection process for each one of the first sublocations and obtaining a set of ML outputs corresponding to the first sublocations; and determining the search vector along a direction extending from the particular location towards, and past, at least one of the first sublocations whose respective ML output indicated a positive detection.

In some implementations, the method further includes executing the detection process for second sublocations along the search vector to obtain a second set of ML outputs corresponding to the second sublocations.

In some implementations, the method further includes responsive to an ML output for one of the second sublocations indicating a negative detection result: selecting third sublocations within a predefined radius of another one of the second sublocations, where an ML output for the other one of the second sublocations indicated a positive detection result; executing the detection process for each one of the third sublocations and obtaining a third set of ML outputs corresponding to the third sublocations; and determining the search vector along a direction extending from the other one of the second sublocations towards, and past, at least one of the third sublocations whose respective ML output indicated a positive detection.

Another aspect can be embodied in methods that include the actions of obtaining labeled training data including first sets of images, each first set of images comprising at least one image from a first perspective, at least one image from a second perspective, and at least one image from a third perspective, wherein each image in each first set of images includes a label indicating whether an electrical grid asset is present in the image, and wherein images in each first set of images are grouped based on representing a common geographic region; obtaining unlabeled training data comprising second sets of images, each second set of images including at least one image from the first perspective, at least one image from the second perspective, and at least one image from the third perspective, and wherein images in each second set of images are grouped based on representing a common geographic region; and training a machine learning model to correlate electrical grid assets in a combination of images representing common geographic locations taken from different perspectives, the training including applying the unlabeled training data and the labeled training data as training input to the machine learning model.

Other implementations of this aspect include corresponding systems, apparatus, and computer programs, configured to perform the actions of the methods, encoded on computer storage devices.

These and other implementations can each optionally include one or more of the following features. In some implementations, the first perspective is an overhead perspective, the second perspective is an oblique perspective, and the third perspective is a ground-level perspective.

In some implementations, at least two of the first or second sets of images each include images representing a same geographic region but taken in different seasons or different weather conditions.

In some implementations, the label indicates a location of a same electrical grid asset within each image within respective first sets of images. Some images in the labeled training data and the unlabeled training data include more than one electrical grid asset, and the method further includes training the machine learning model to distinguish between multiple electrical grid assets in each image.

In some implementations, at least one image from the first, second, or third perspectives is omitted from at least one of the first sets of images.

In some implementations, at least one image from the first, second, or third perspectives is omitted from at least one of the second sets of images.

In some implementations, the labeled training data and the unlabeled training data each include a respective matrix of training images including multiple rows of training data for an electrical grid asset, each row including a different combination of images from the first, second, or third perspectives.

In some implementations, the electrical grid asset includes any one of: electric poles, power towers, or components on electric poles or power towers.

Other embodiments of these and other aspects include corresponding systems, apparatus, and computer programs, configured to perform the actions of the methods, encoded on computer storage devices. A system of one or more computers or other processing devices can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular implementations of the subject matter described in this specification can be implemented so as to realize one or more of the following advantages. Implementations may provide the advantage of detecting and localizing power poles with greater accuracy than methods that employ only one type of image. For example, the system learns patterns from different perspectives of the same location, and uses these patterns to more accurately detect and locate power poles. This is advantageous in that having accurate locations for power poles allows for a more accurate model of an electrical grid. The specification presents a technique for building a machine learning model that is trained to detect and localize power poles. The technique can also be generalized to detect and localize power towers and assets.

The system employs a machine learning model, e.g., a binary classifier, to predict whether there is a pole at a specified latitude-longitude using different types of images or images from different perspectives. The system leverages the overlap of visual clues from the different types of images to identify the same object in the different types of images.

The machine learning model can be trained using images of known poles and images without poles. The machine learning model can be made more robust by omitting certain types of data during the training process. For example, each known pole in the training data can be expanded to multiple rows of training data by including different combinations of the types of images in each row of training data for a known pole. The machine learning model can also be made more robust by training with sets of training data from different times of day and different seasons.

The system can also be generalized to detect and localize other objects. For example, the system can detect and localize telecommunications poles and assets, streetlights, power towers, and assets on power poles such as transformers and switches. To detect and localize assets, the system can train a multi-class classifier to predict what kind of asset is on a pole at a specified latitude-longitude.

In some instances, the system can also be expanded to incorporate other types of data into a machine learning model, such as other types of imagery data, sensor data, utility data, etc., which can provide for more accurate predictions.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
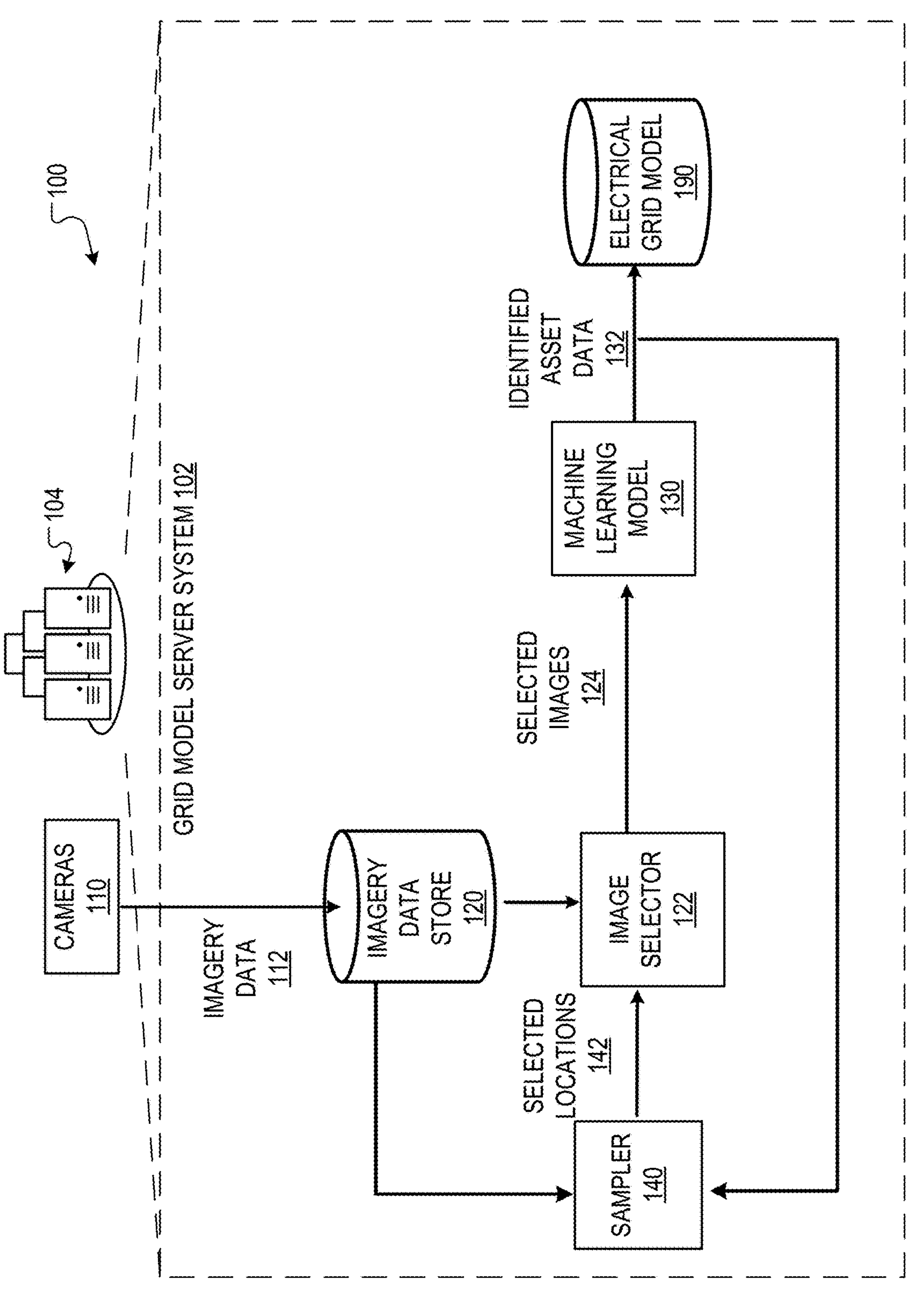
FIG. 1 is a block diagram of an example system for modeling electrical grid assets.

FIG. 1 is a block diagram of an example system 100 for modeling electrical grid assets. The system 100 includes a server system 102. The server system 102 may be hosted within a data center 104, which can be a distributed computing system having many computers in one or more locations.

The server system 102 includes an imagery data store 120, an image selector 122, a machine learning model 130, an electrical grid model 190, and a sampler 140. Components and modules of the server system 102 can be provided as one or more computer executable software modules or hardware modules. That is, some or all of the functions of the server system 102 can be provided as a block of computer code, which upon execution by a processor, causes the processor to perform functions described below. Some or all of the functions of the server system 102 can be implemented in electronic circuitry, e.g., by individual computer systems (e.g., servers), processors, microcontrollers, a field programmable gate array (FPGA), or an application specific integrated circuit (ASIC).

The electrical grid model 190 is a computer model of the electrical grid. The electrical grid model 190 can be used to provide a graphical display of features of a region to a user. The electrical grid model 190 can include, for example, locations of electric poles, power towers, or components on electric poles or power towers. For example, components can include medium voltage distribution lines, distribution switches and reclosers, fixed and switched capacitors, voltage regulation schemes, e.g., tapped magnetics or switched capacitors, etc. The electrical grid model 190 can provide a geographical overlay of where electric poles are located with respect to other electrical grid components, vegetation, roads, or other geographical features, for example. In some implementations, the electrical grid model 190 can include information about updates to the electrical grid model 190. For example, when an electrical grid asset is added to electrical grid model 190, the electrical grid model 190 can include the date and time the images used to identify the electrical grid asset were taken.

The server system 102 obtains imagery data 112 from cameras 110. For example, the imagery data can be from an overhead perspective, from an oblique perspective, or from a ground-level perspective as described below with reference to FIGS. 2A-2C. Electrical grid asset detection can be improved by using more than one type of image or image from a different perspective. For example, images from an overhead perspective typically have accurate latitude and longitude information, but have a low resolution for electrical grid assets such as electric poles. Images from a ground-level perspective typically have a high resolution for electrical grid assets, but usually lack latitude and longitude information. Images from an oblique perspective typically have higher resolution than images from an overhead perspective and can provide multiple views of the same electrical grid asset, but usually lack information on the latitude and longitude of the electrical grid asset.

In some examples, the cameras 110 are mounted on aerial vehicles. Multiple cameras can be mounted to an aerial vehicle, capturing images from various perspectives, such as oblique or overhead, as the aerial vehicle passes over a geographic region. In some examples, the cameras 110 are mounted on ground vehicles. Multiple cameras can be mounted to a vehicle on the ground, capturing images from different positions on the ground. For example, the cameras can be mounted to a utility company's vehicle.

The imagery data 112 can include images of varying resolutions. The imagery data 112 can include large numbers of images, e.g., hundreds of images, of the same location. The imagery data 112 can include images captured during multiple flights or drives performed by the same aerial or ground vehicle, or different aerial or ground vehicles. A location can be defined by a coordinate location, for example. In some examples, images of the same location can include images of a range of coordinate locations surrounding a coordinate location.

The cameras 110 can include visible light cameras, infrared sensors, RADAR sensors, and LIDAR sensors. The imagery data 112 can include visible light data, e.g., red-green-blue (RGB) data, hyperspectral data, multispectral data, infrared data, RADAR data, and LIDAR data collected by the cameras.

The imagery data 112 includes images that represent features of a geographic region, e.g., the collection of images in imagery data 112 are representative of the geographic region. The geographic region can include, for example, an area of hundreds of square meters, several kilometers, hundreds of kilometers, or thousands of kilometers. The geographic region can correspond to a location of an electrical distribution feeder or multiple feeders. In some cases, the geographic region can correspond to a location of a bulk power system within and throughout, e.g., a state, county, province, or country. The server system 102 can store the imagery data 112 in the imagery data store 120.

The imagery data 112 can include metadata associated with each image in imagery data 112. The metadata for an image can include, for example, data indicating a location of the camera that captured the image, an orientation of the camera that captured the image, and/or a date and time that the image was captured. The location of the camera can be stored, for example, as GPS coordinate locations, e.g., latitudinal and longitudinal coordinate locations. The metadata can be captured by the cameras 110, by a computing system of the vehicle to which the cameras are mounted, or both. The metadata can also include sense of vehicle data for ground-level images.

The orientation of a camera 110 that captured imagery data 112 can include, for example, a yaw, pitch, and roll of the camera. The yaw can represent rotation around a vertical axis with respect to a ground plane. For example, a yaw of zero can represent a camera pointing north, and a yaw of one hundred eighty can represent a camera pointing south. The pitch can represent rotation around a horizontal axis with respect to the ground plane. For example, a pitch of zero can represent a camera pointing downward toward the ground, and a pitch of one hundred can represent a camera pointing upwards toward the sky. The roll can represent rotation around a horizontal axis that is perpendicular to the pitch axis. In some examples, the orientation of the camera includes an elevation of the camera relative to the ground.

In some examples, a camera 110 is mounted on a vehicle, and the orientation of the camera can be determined based on a direction of travel of the vehicle at the time when the image was captured. For example, the camera may have a fixed position and orientation relative to the vehicle, e.g., a yaw of ninety degrees relative to the direction of motion of the vehicle. Thus, based on the direction of travel of the vehicle, the yaw of the camera can be computed.

The system 102 uses sampler 140 to select locations to perform a detection process for electrical grid assets. For example, the sampler 140 can receive overhead images from the imagery data store 120. The sampler can determine one or more sets of geographic coordinates of potential electrical grid assets from the overhead images. The sampler can output the sets of geographic coordinates as selected locations 142 to the image selector 122.

The system 102 can perform the detection process at each of a number of iterations. In some implementations, the number of iterations can be predefined. In some implementations, the system can perform the detection process until a threshold has been reached. For example, the threshold can be a threshold number of electrical grid assets detected.

In some implementations, for example, the sampler 140 can output randomly selected locations 142. In other implementations, the sampler 140 can receive an input from a user, for example, that specifies selected locations 142. In some implementations, the sampler 140 can output selected locations 142 in a predefined pattern, for example, at fixed distances and directions relative to each other (e.g., a grid pattern).

The sampler 140 can also select locations 142 based on received identified asset data 132, as described below. For example, the sampler 140 can receive identified asset data 132 that indicates a positive identification of an electrical grid asset at certain locations in the region. The sampler 140 can select a number of sublocations within the region to output as selected locations 142. In some implementations, the sampler 140 can select random sublocations. Selecting sublocations for the search process will be described in more detail below with reference to FIGS. 3A-3B.

The image selector 122 receives selected locations 142 and selects sets of images at those locations from the imagery data store 120 for use in modeling the electrical grid. For each selected location, the image selector 122 selects a set of two or more images at the location (e.g., selected images 124) to be used to determine whether a same electrical grid asset is depicted in each image in the set of images. The selected images 124 also includes metadata for the images that were selected. For example, the image selector 122 can select, from the imagery data store 120, multiple images of the same location taken from different perspectives, such as overhead, oblique, or ground-level. For example, the image selector 122 can select images that are located within a specified geographic range to each other and the selected location, i.e., the image selector 122 searches the imagery data store 120 for images with metadata that indicates the images were taken at or near the location. For example, the image selector 122 can select images that are captured from locations within a threshold geographic range of a quarter mile from each other. In some examples, the image selector 122 can select images that include, in their field of view, a same geographic point. For example, the image selector 122 can perform bundle adjustment to select images that include the same geographic point.

The image selector 122 outputs selected images 124 to the machine learning model 130. The machine learning model 130 receives as input the selected images 124 and is trained to identify electrical grid assets depicted within the selected images 124. For each set of images corresponding to a selected location in selected images 124, the system 102 can run the machine learning model and identify whether the same electrical grid asset is depicted in the images. The machine learning model 130 will be described in further detail with reference to FIGS. 4-7.

The machine learning model 130 outputs identified asset data 132 that can indicate a positive identification of an electrical grid asset depicted for each set of images in selected images 124. The identified asset data 132 can include GPS coordinate locations for each electrical grid asset. The machine learning model 130 can output identified asset data 132 to electrical grid model 190 and sampler 140.

The system 102 can add the identified asset data 132 to an existing model of the electrical grid, e.g., electrical grid model 190. For example, the system can determine whether the electrical grid model 190 includes data representing the electrical grid assets in identified asset data 132. If the electrical grid model 190 does not include data representing the electrical grid assets in identified asset data 132, the system 102 can update the electrical grid model 190 to include the electrical grid assets. For example, the system 102 can update the electrical grid model 190 to include graphical or geographical representations of the electrical grid assets. For example, the electrical grid assets can include electric poles or electrical components attached to the pole (e.g., transformers, reclosers, switches). In some implementations, when updating the electrical grid model 190 to include the electrical grid assets, the system 102 can also include data representing when the electrical grid assets were added to the electrical grid model 190, or when the selected images 124 used to identify the electrical grid assets were taken.

Adding or updating the location of a grid asset or multiple grid assets to the electrical grid model 190 can improve accuracy of monitoring and/or simulating electrical power grid operations using the electrical grid model 190.

The sampler 140 can receive the identified asset data 132 and select a number of sublocations within the region to output as selected locations 142, as described with reference to FIGS. 3A-3B.

In some implementations, the system 102 can perform verification of sensor data. For example, the sampler 140 can receive data from a sensor connected to the electrical grid. The data can include the geographic position of the sensor. To verify whether the sensor is attached to an electrical grid asset at the geographic position, the sampler 140 can output the location of the sensor as selected location 142 to the image selector 122. The image selector 122 can select images at the selected location 142, and provide the selected images 124 to the machine learning model 130. The machine learning model 130 can identify whether the same electrical grid asset is depicted in selected images 124. If the machine learning model 130 makes a positive identification of an electrical grid asset in the selected images 124, the system 102 can verify that the sensor is attached to an electrical grid asset at the sensor's geographic location. If the machine learning model 130 does not make a positive identification of an electrical grid asset in the selected images 124, the system 102 can determine that there is an error in the sensor data, for example, or the sensor is not attached to an electrical grid asset. The system 102 can thus verify whether the sensor is attached to an electrical grid asset.

In some implementations, the system 102 can track changes in an electrical grid. For example, the sampler 140 can obtain a location of an existing electrical grid asset from the electrical grid model 190. To verify whether the electrical grid asset is currently at the location represented in electrical grid model 190, the sampler 140 can output the location as selected location 142 to the image selector 122. The image selector 122 can select images at the selected location 142. For example, the image selector 122 can select images taken after the existing electrical grid asset was added to the electrical grid model 190. The image selector 122 can provide the selected images 124 to the machine learning model 130. The machine learning model 130 can identify whether the same electrical grid asset is depicted in selected images 124. If the machine learning model 130 makes a positive identification of an electrical grid asset in the selected images 124, the system 102 can verify that the electrical grid asset exists at the location represented in electrical grid model 190. If the machine learning model 130 does not make a positive identification of an electrical grid asset in the selected images 124, the system 102 can determine that the electrical grid asset that used to be at that location has moved or no longer exists as of the date and time the selected images 124 were taken. The system 102 can then update the electrical grid model 190 by removing the representation of the electrical grid asset at the location.

For example, a user may want to verify whether an electric pole at a street corner represented in electrical grid model 190 exists at the street corner. The sampler 140 can receive an input from a user that includes the location of the electric pole. The system 102 can verify that the electric pole exists at the location, for example, and provide an output to the user that indicates the electric pole exists at the location represented in electrical grid model 190. If the system 102 determines that the electric pole has moved or no longer exists, the system 102 can update the electrical grid model 190 and provide an update to the user that indicates the electric pole has moved or no longer exists.

In some implementations, the system 102 can update sections of the electrical grid model 190. For example, the sampler 140 can select multiple electrical grid assets located in a certain geographic range from the electrical grid model 190. The system 102 can determine which of the electrical grid assets have moved or no longer exist at the locations specified in electrical grid model 190. The system 102 can update the electrical grid model 190 section-by-section, for example. In some implementations, the system 102 can update sections of the electrical grid model 190 at a set interval of time. In some implementations, the system 102 can update sections when the imagery data store 120 receives new imagery data 112.

Figure 2A:
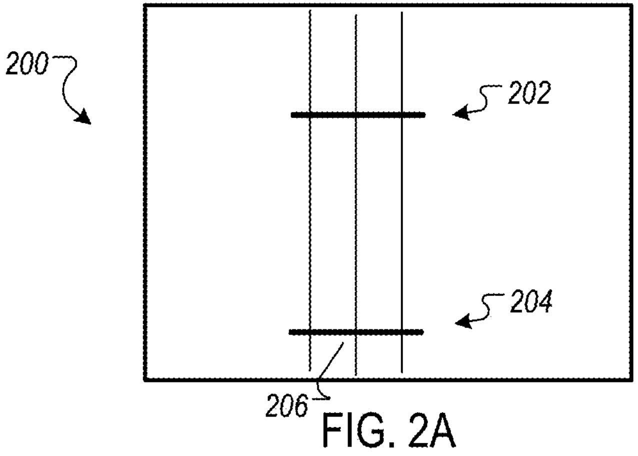
FIGS. 2A-2C illustrate example overhead, oblique, and ground-level images of electric poles.
Figure 2B:
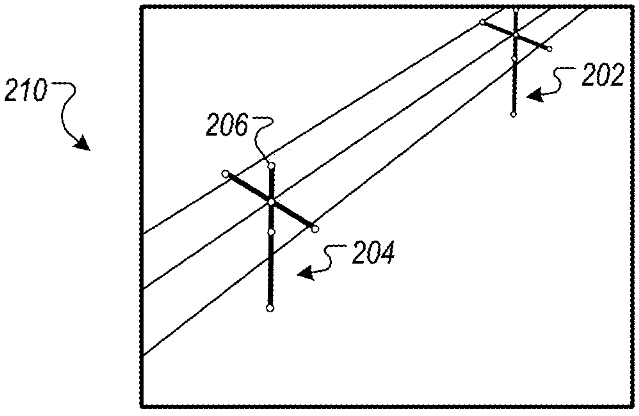
Figure 2C:
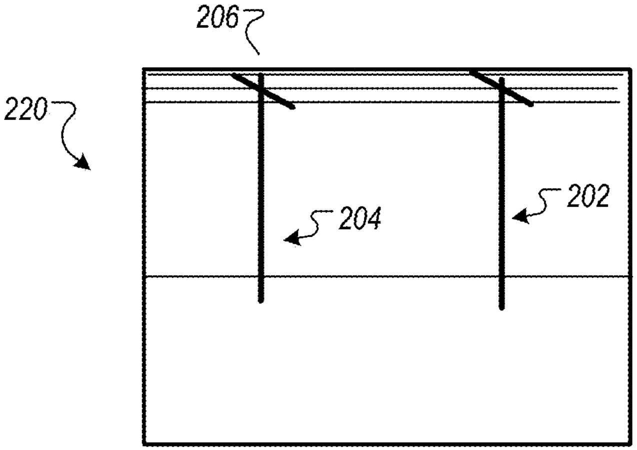

FIGS. 2A-2C illustrate example overhead, oblique, and ground-level images of electric poles. Overhead image 200 depicts electric pole 202 and electric pole 204 from an overhead perspective, for example, taken from a satellite or aerial vehicle. Oblique image 210 depicts electric pole 202 and electric pole 204 from an oblique perspective, for example, taken from an aerial vehicle. Ground-level image 220 depicts electric pole 202 and electric pole 204 from a ground-level perspective, for example, taken from a ground vehicle or camera on the ground.

A machine learning model such as the machine learning model 130 of FIG. 1 can be trained to receive images such as images 200, 210, and 220, and identify the same electrical grid asset in the images 200, 210, and 220. The electrical grid asset can be, for example, an electric pole or a component on an electric pole. For example, the machine learning model 130 can identify that electric pole 202 is the same pole depicted in images 200, 210, and 220. The machine learning model 130 can also identify that electric pole 204 is the same pole depicted in images 200, 210, and 220. The machine learning model 130 can also identify that component 206 is the same component depicted in images 200, 210, and 220. For example, the machine learning model 130 can be trained to identify the same electric pole in images 200, 210, and 220 using visual clues such as characteristics of the electric pole, the area surrounding the electric pole, and other visual features depicted in the images, such as vegetation. Characteristics of the electric pole can include, for example, visible features of the pole or electrical components attached to the pole. The training of the machine learning model 130 will be described in further detail with respect to FIGS. 5-7. Similar types of visual clues can be used to identify other electrical grid assets such as electrical components.

Figure 3B:
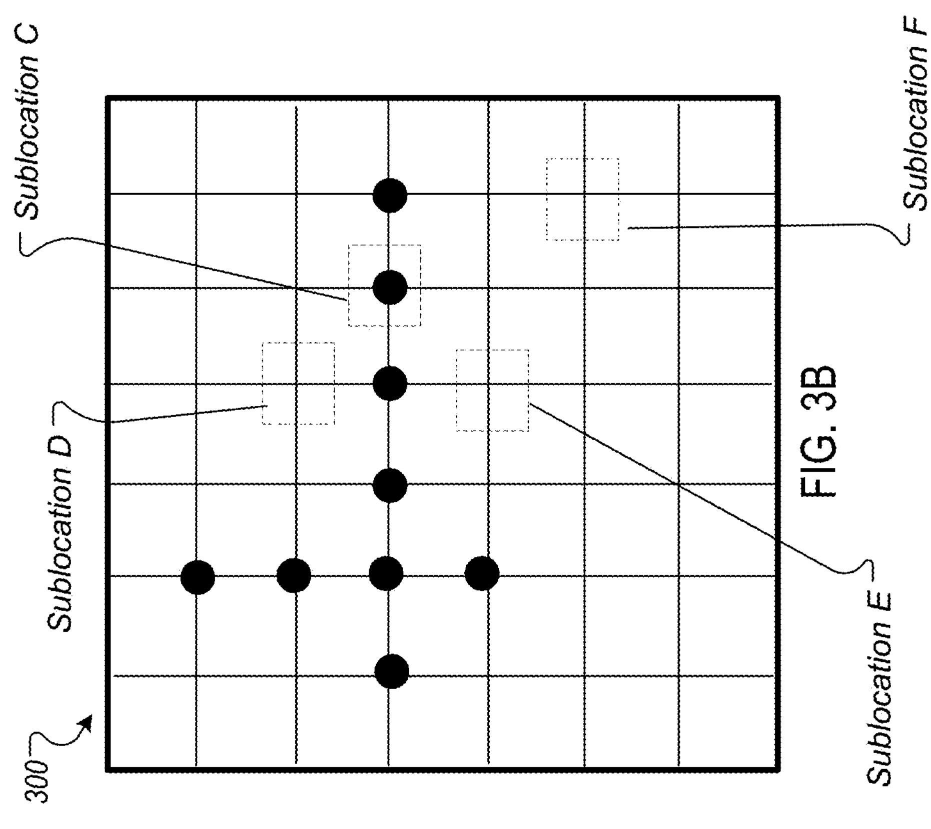
FIGS. 3A-3B are a graphical representation of an example imagery search process to geo-locate electrical power lines.
Figure 3A:
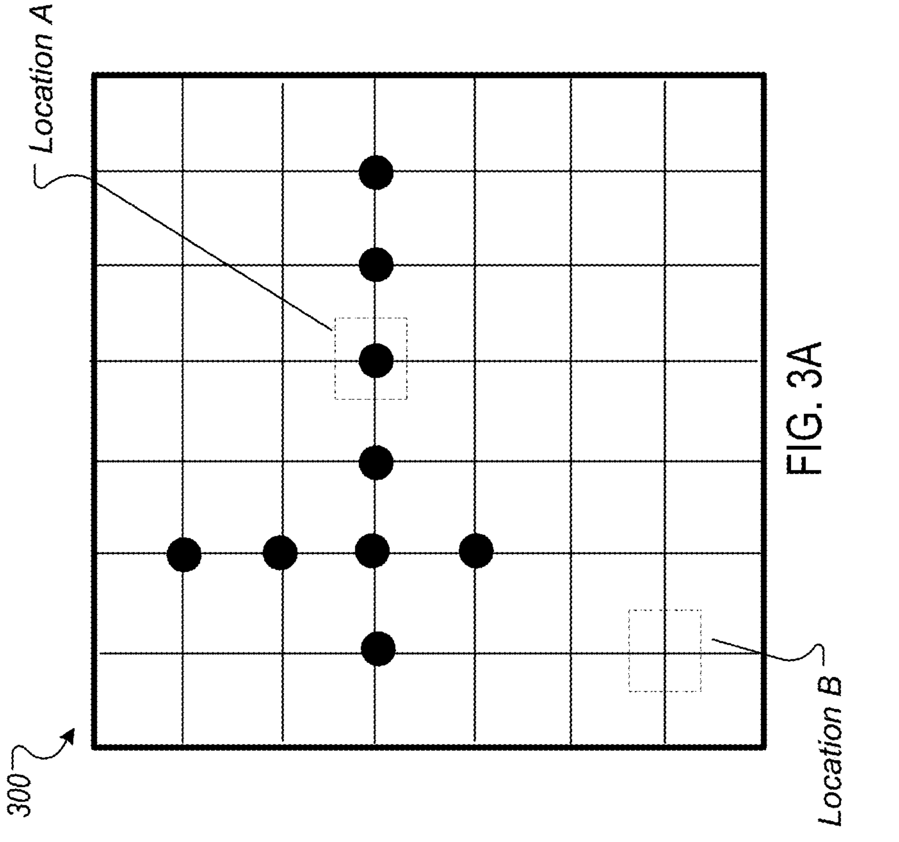

FIGS. 3A-3B are a graphical representation of an example imagery search process to geo-locate electrical power lines. A sampler such as sampler 140 of FIG. 1 may perform the imagery search process. A system such as the system 102 of FIG. 1 may perform the detection process at different locations and sublocations determined by the imagery search process. Each circle in FIGS. 3A-3B represents an electrical grid asset, for example, an electric pole. Compared to a completely random search, the imagery search process can make modeling an electrical grid more efficient and maximize the efficiency of computing resources.

For example, the sampler may select initial locations that are a farther distance away from one another. The sampler may select locations randomly located within region 300 that are at least a certain distance apart from each other, or at a fixed distance from each other. For example, as shown in FIG. 3A, the sampler may select location A and location B within region 300. In the example of FIG. 3A, the system may perform the detection process and identify one electric pole at location A, and zero electric poles at location B.

The sampler can then select sublocations within the region 300. For each of the initial locations, the sampler can select sublocations for the system to perform the detection process on. For example, the sampler can receive data that indicates a positive identification of an electrical pole at the initial locations. In the example of FIGS. 3A-3B, the sampler receives data that indicates a positive identification of an electric pole at location A. As shown in FIG. 3B, the sampler can select one or more sublocations, such as sublocations C, D, and E, that are located near location A.

In some implementations, the sampler can select sublocations randomly near location A. In some implementations, the sampler can select sublocations randomly near location A until the sampler receives data that indicates a positive identification of an electric pole. The sampler can then select sublocations in the direction of or close to the positive identification.

In some implementations, the sampler can select sublocations along a search vector. For example, for an initial location for which the sampler received data that indicates a positive identification, the system can determine a search vector by selecting first sublocations within a predefined radius of the initial location, executing the detection process for each one of the first sublocations and obtaining a set of outputs corresponding to the first sublocations, and determining the search vector along a direction extending from the initial location towards, and past, at least one of the first sublocations with a positive identification. The system can also execute the detection process for second sublocations along the search vector to obtain data indicating a positive or negative identification of an electric pole. Responsive to data that indicates a negative identification at one of the second sublocations, the system can select third sublocations within a predefined radius of another one of the second locations, where the data indicated a positive detection result. The system can execute the detection process for each one of the third sublocations and obtain a third set of data indicating a positive or negative identification corresponding to the third sublocations. The system can then determine the search vector along a direction extending from the other one of the second locations towards, and past, at least one of the third sublocations with a positive identification.

In some implementations, the sampler can select sublocations located vertically or horizontally, for example, in a grid pattern, relative to location A. Many electric poles in electrical grids are laid out in grid patterns, and searching vertically and horizontally from an identified electric pole can make the search process more efficient. In some examples, electric poles may be laid out at angles. In some implementations, the sampler can select sublocations that expand the search in multiple directions, for example, in a circle, relative to location A. The sampler can then select sublocations along a direction with a positive identification.

In the example of FIG. 3B, the sampler selected sublocation C located horizontally from location A, and sublocations D and E located vertically from location A. The sampler can receive data that indicates a positive identification of an electric pole at location C. The sampler can thus select sublocations for location C that are located horizontally from locations A and C. The sampler can select sublocations for locations D and E that are farther away from locations D and E, similarly to the sublocations selected for location B described below.

In the example of FIG. 3A, the sampler did not receive data that indicates a positive identification at location B, so the sampler can select one or more sublocations that are located farther away from location B. As shown in FIG. 3B, the sampler can select sublocation F, which is located farther away from location B than sublocations C, D, and E are located from location A. In some implementations, the sampler can select sublocation F at a random distance and direction from location B. In other implementations, the sampler can select sublocation F at a fixed distance and direction from location B.

The number of sublocations the sampler selects for each location can be based on whether an electrical grid asset was identified in the location. The sampler can select a larger number of sublocations near locations with identified electrical grid assets to allow the system to focus the detection process on areas with more electrical grid assets or areas with a higher density of electrical grid assets. For example, if the system did not identify an electrical grid asset in location B, the sampler can select no sublocations or one sublocation to perform the detection process on. The system identified an electrical grid asset in location A, so the sampler can select sublocations C, D, and E to perform the detection process on.

In implementations where the sampler selects sublocations geographically close to the location, the distance of the sublocations from the location can be based on whether an electrical grid asset was identified in the location. For example, the sampler can select sublocations closer to identified electrical grid assets to allow the system to focus the detection process on areas with a higher density of electrical grid assets. For example, the sampler can select sublocation F for location B, which is farther away from location B than the selected sublocations C, D, and E are from location A.

In some implementations, the system can select sublocations based on a proportion of locations where electrical grid assets were identified. For example, if the system sampled five nearby locations and four of the locations had identified electrical grid assets, the system can select sublocations close to those five locations. If the system sampled five locations and two of the locations had identified electrical grid assets, the system can select sublocations farther away from the five locations.

Figure 4:
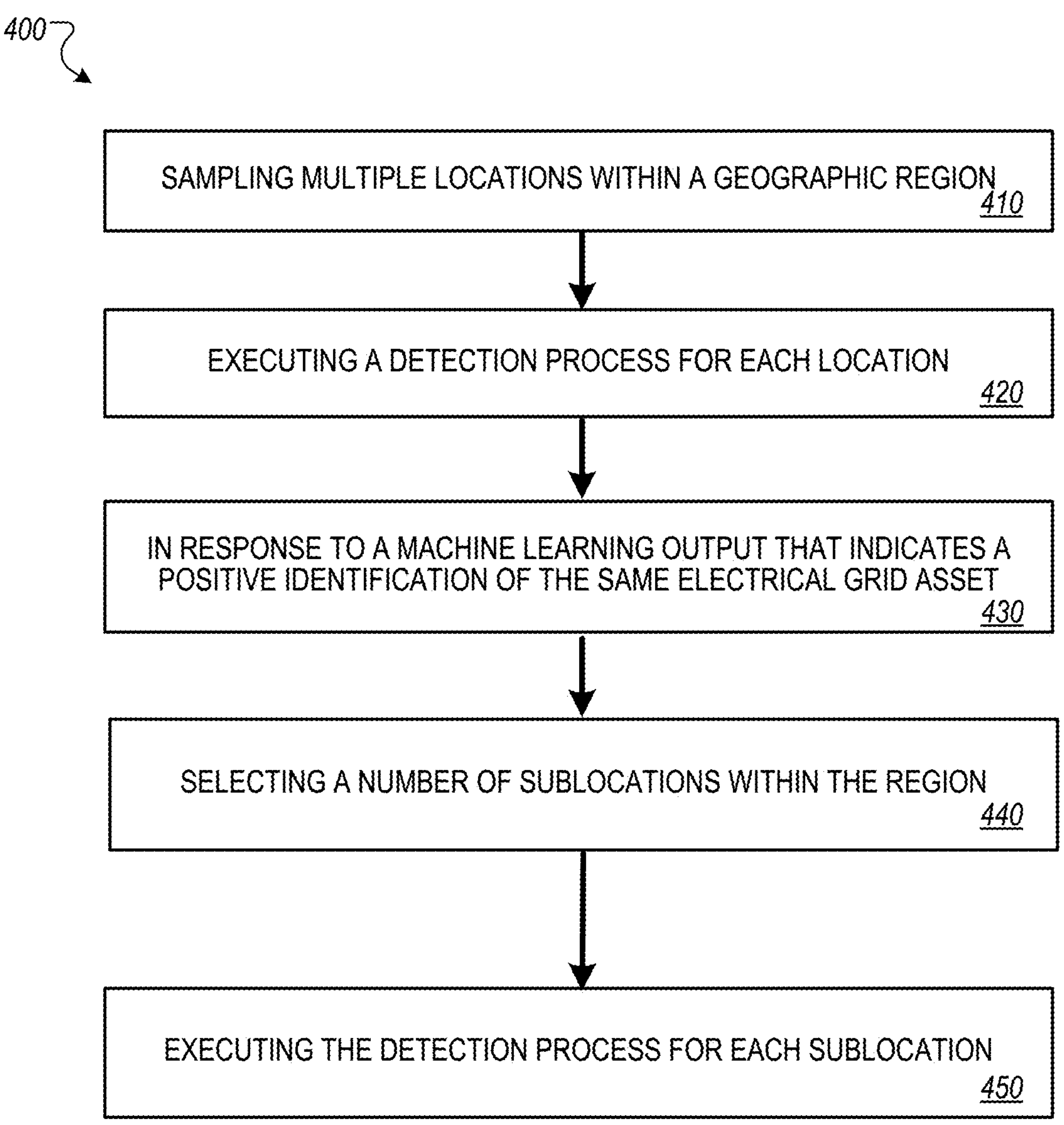
FIG. 4 is a flowchart of an example process for modeling electrical grid assets.

FIG. 4 is a flowchart of an example process 400 for mapping electrical grid assets. The process 400 can be executed by one or more computing systems including, but not limited to, the system 100, described above, to identify and map electrical grid assets.

The system samples multiple locations within a geographic region (410). The system can select one or more locations randomly, or obtain one or more locations through a user input. In some implementations, the system can select locations located at fixed distances relative to each other. The system can then obtain a set of images of each location. Each set of images can include at least one image of the location from a first perspective, at least one image of the location from a second perspective, and at least one image of the location from a third perspective. For example, each set can include at least one image of the location from overhead, oblique, and ground-level perspectives.

The system executes a detection process for each location (420). The detection process includes applying the set of images for the location as input to a machine learning (ML) model that is trained to identify electrical grid assets depicted within images taken from a combination of different perspectives. The detection process also includes obtaining an output from the ML model that indicates whether a same electrical grid asset is identified in each of the images of the location. For example, an electrical grid asset can be an electric pole, a power tower, or a component on an electric pole or power tower.

In response to an ML output that indicates a positive identification of the same electrical grid asset being depicted in a particular set of images of a particular location (430), the system selects a number of sublocations within the region (440). Each sublocation can cover a different area of the region near the particular location. As described with reference to FIGS. 3A-3B, the number of sublocations within the region can be based on whether an electrical grid asset was identified in the location. For example, the system can select a larger number of sublocations for a location with identified electrical grid assets. The system can select a smaller number of sublocations for a location without identified electrical grid assets. A distance of the sublocations from the location can be based on whether an electrical grid asset was identified in the location. For example, the system can select sublocations closer to locations with identified electrical grid assets than to locations without identified electrical grid assets. The system can select sublocations farther from locations with identified electrical grid assets than from locations with identified electrical grid assets.

The system executes the detection process for each sublocation (450). For example, the system returns to step 410 and applies each sublocation as the one or more locations that are sampled. In some implementations, the system can determine a search vector along which the number of sublocations are selected. For example, the system can form search vectors from the location of a positive detection or identification. The system can select sublocations that are located within a predefined radius of the particular location in which a positive detection was made. The system can execute the detection process for each of the sublocations and obtain a set of ML outputs corresponding to the sublocations. When a second detection is located within the radius, the system can form a search vector between the two locations with positive detections and perform further searches in sublocations along the search vector. In some implementations, the system executes the detection process for sublocations along the search vector to obtain another set of ML outputs corresponding to the sublocations. The system may continue searching sublocations along the search vector, that is, selecting sublocations along the search vector within a predefined radius of the sublocation whose ML output indicated a positive detection, and where the ML output of the newly selected sublocation indicated a positive detection result. The system can execute the sampling and detecting process so long as electrical grid assets are detected in the sublocations. The system can thus determine the search vector along a direction extending from the location in which a positive detection was made towards, and past, at least one of the sublocations whose ML output indicated a positive detection that was located within a predefined radius of the location in which a positive detection was made. Once a sublocation along the search vector results in a negative result (e.g., no electrical grid asset is detected), the system can conduct a radius search in sublocations around the location of the last or most recent positive detection along the search vector. The negative result may indicate a corner or turn in a set of power lines, for example. The new radius search should result in a new positive direction and a new search vector can be created indicating the change in direction. The search can then continue along the new search vector.

In some implementations, ML outputs that indicate a positive identification of the same electrical grid asset can be used to create or update an electrical grid model. ML outputs that do not indicate a positive identification of the same electrical grid asset can also be used to update the electrical grid model. For example, if the electrical grid model includes an electrical grid asset at a particular geographic location, but the ML outputs do not indicate that there is a same electrical grid asset at the particular geographic location, the electrical grid model can be updated to not include the electrical grid asset.

In some implementations, the detection process can apply different types of images or types of sensor data. For example, sensor data can include time series data, information about customers of the electrical grid, or information about components of the electrical grid. The system can obtain sensor data from a sensor connected to the electrical grid. For example, the system can receive the data from a sensor located at the particular location, or send a request for data to a sensor located at the particular location.

Figure 5:
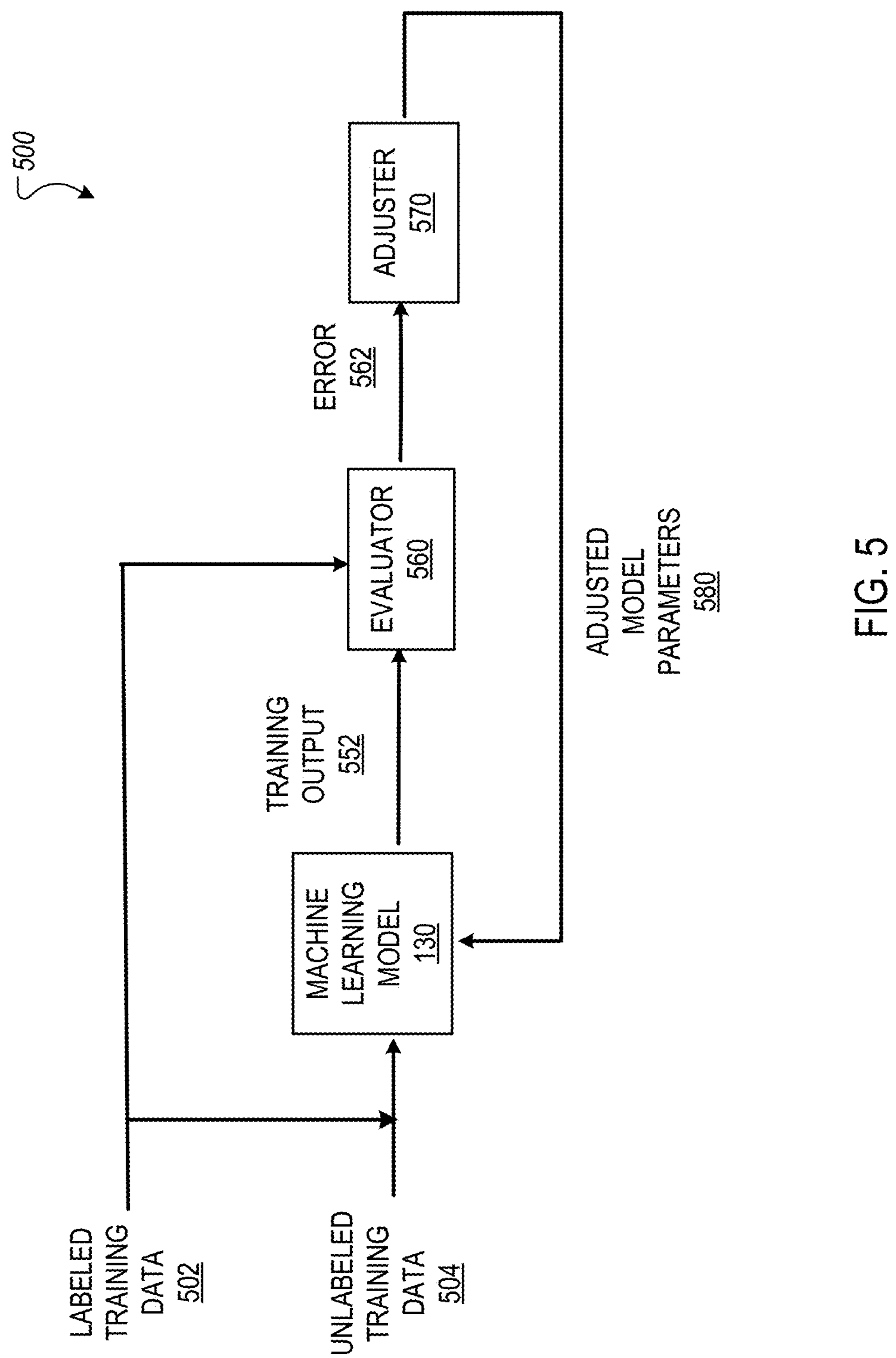
FIG. 5 is a diagram of an example system for training a machine learning model to identify electrical grid assets.

FIG. 5 is a diagram of an example system 500 for training a machine learning model to identify electrical grid assets. The system 500 includes the machine learning model 130, an evaluator 560, and an adjuster 570. The machine learning model 130, evaluator 560, and adjuster 570 can each be provided as one or more computer executable software modules or hardware modules. Some or all of the functions of the machine learning model 130, evaluator 560, and adjuster 570 can be implemented in electronic circuitry, e.g., by individual computer systems (e.g., servers), processors, microcontrollers, an FPGA, or an ASIC.

The system 500 can obtain training data. The training data can include images from different perspectives, for example, overhead, oblique, and ground-level images of the same locations. Example images from different perspectives are shown in FIGS. 2A-2C. Some images depict known electrical grid assets. For example, information about known electrical grid assets, such as geographic coordinates of electrical grid assets, can be obtained from a database maintained by a utility company. The images can include a label indicating whether an electrical grid asset is present in the images. For example, an image can include a bounding box that marks up the boundary of an electrical grid asset in a rectangle for each electrical grid asset present in the image. Each bounding box can be associated with a textual class that indicates a type of electrical grid asset, for example. The label can also indicate a location of an electrical grid asset within the image. For example, the images can be labeled with geographic coordinates for each electrical grid asset visible in the images. Some images do not have any visible electrical grid assets.

In some implementations, the system 500 can generate the training data by obtaining a list of locations of known electrical grid assets, obtaining overhead, oblique, and ground-level images of each of the locations, and labeling the visible electrical grid assets in each image. The system 500 can also obtain images of locations without electrical grid assets.

In some implementations, the training data can include multiple images from each perspective for a location. For example, the training data can include multiple overhead, oblique, and ground-level images for a location. Each of the multiple overhead, oblique, and ground-level images can depict the location in different seasons, weather conditions, or timing conditions. An example of different types of images, e.g., images from different perspectives, at different times of the year is shown below in FIG. 6.

In some implementations, the training system 500 can apply different types of images or types of sensor data as training data. For example, the training system 500 can obtain sensor data from sensors located on electric grid components such as electric poles. If the sensor data indicates the geographic position of the sensor, the training system 500 can concatenate the sensor data to the set or sets of images corresponding to the same geographic position.

The system 500 can split the training data into labeled training data 502 and unlabeled training data 504. For example, labeled training data 502 can include labeled images from the training data at certain locations. Unlabeled training data 504 can include unlabeled versions of a subset of the images from labeled training data 502 at certain locations.

In some implementations, the system 500 can omit at least one image from the different perspectives from at least one of the sets of labeled training data and unlabeled training data. For example, the system 500 can omit the ground-level image from a set of labeled training data and unlabeled training data for a particular location. For example, an electric pole or power tower can be located in a mountain or backyard, where it may be difficult to obtain ground-level images. Thus the machine learning model 130 can be trained on training inputs that more closely resemble the inputs the machine learning model 130 might receive after training, such as when the detection process is run as described in FIG. 4. Training the machine learning model 130 on inputs that more closely resemble the inputs at inference can improve the accuracy and performance of the machine learning model 130.

In some implementations, the labeled training data 502 and unlabeled training data 504 can each include a matrix of training images including multiple rows of training data for each electrical grid asset. For example, each row in the matrix can include a different combination of the images from different perspectives. For example, one row can include overhead, oblique, and ground-level images. Another row can include overhead and oblique images, another row can include oblique and ground-level images, and another row can include overhead and ground-level images. Further rows can include additional combinations of the images from different perspectives and other types of training data such as sensor data.

The machine learning model 130 is trained to correlate electrical grid assets in a combination of images representing common geographic locations taken from different perspectives. For example, the machine learning model 130 can be a classifier that predicts whether there is an electrical grid asset at a specified location using the images from different perspectives of the region around the location. For example, the machine learning model 130 can output the geographic coordinates of the electrical grid asset.

Figure 6:
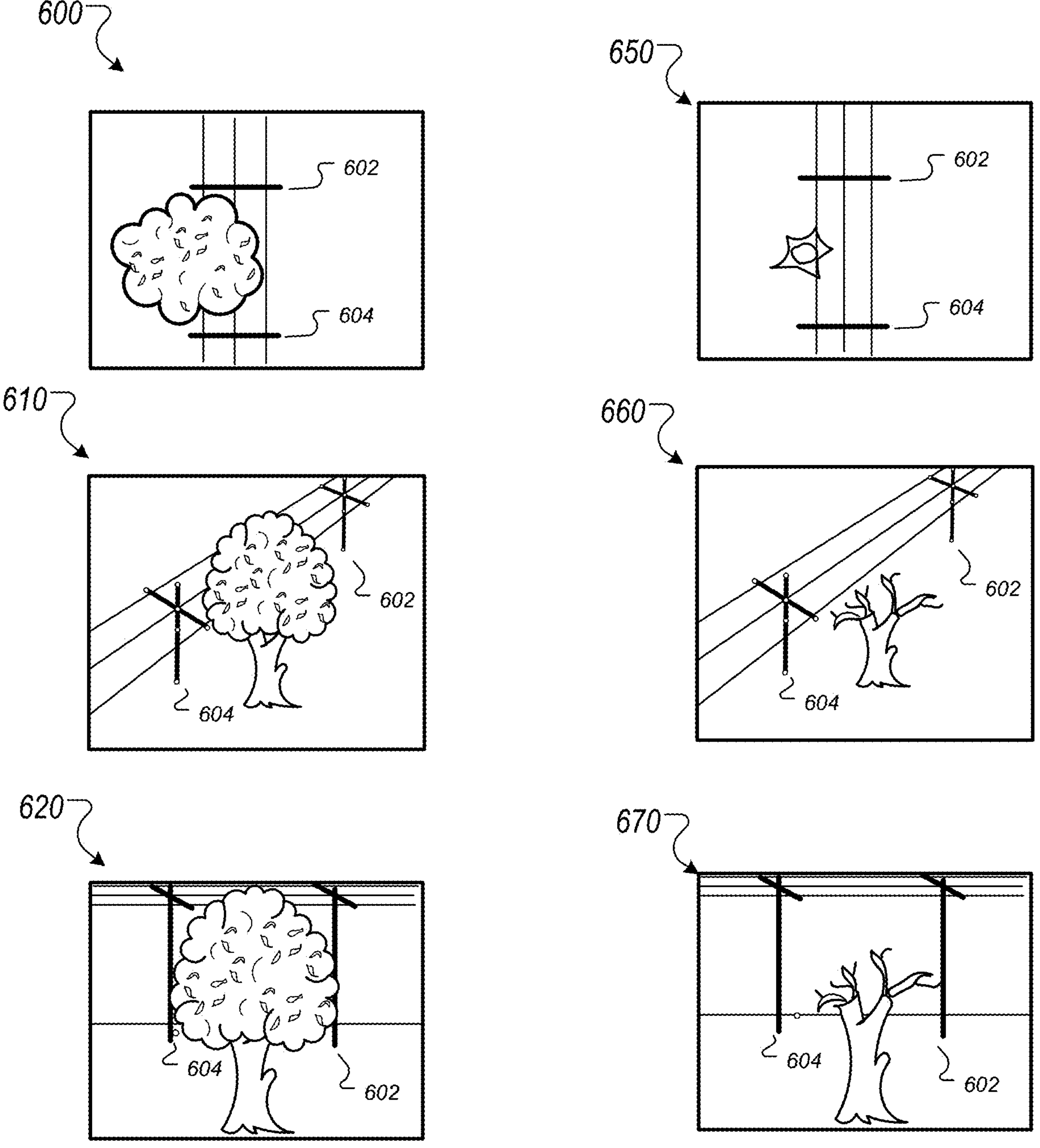
FIG. 6 illustrates example overhead, oblique, and ground-level images of electric poles.

The system 500 trains the machine learning model 130 by applying labeled training data 502 and unlabeled training data 504. For example, in implementations where the labeled training data 502 is labeled with bounding boxes and class labels, the machine learning model 130 can learn from pixels within bounding boxes. For example, the machine learning model 130 can use visual clues in each image to match features across the images. Visual clues can include characteristics of the electrical grid asset visible from different perspectives, or background characteristics of the electrical grid asset. For example, an electric pole can have characteristics such as a color or markings. An electric pole can also include electrical components such as reclosers and transformers that can be used to identify the electric pole. For example, electrical components can be located at different locations and orientations on different electric poles. Background characteristics can include roads, vegetation, or geographical features. For example, FIG. 6 shows a tree located near electric poles 602 and 604 that can be used as a visual clue to match features across images taken from different perspectives.

The machine learning model 130 can be trained to identify electrical grid assets, such as electric poles or power towers, depending on the electrical grid assets depicted in the training data. For example, to train the machine learning model 130 to identify electric poles, the training data can include images of electric poles. To train the machine learning model 130 to identify power towers, the training data can include images of power towers.

In some implementations, the machine learning model 130 can be trained to identify what type of electrical grid asset is at a location. For example, the machine learning model 130 can be a multi-class classifier that predicts what type of electrical grid asset is on an electric pole at a specified location. For example, the machine learning model 130 can be trained on training data that includes images of different types of electrical grid assets from different perspectives. For example, if the labeled training data 502 is labeled with bounding boxes and class labels, the machine learning model 130 can learn from pixels within bounding boxes and associate each bounding box with a corresponding class label.

In some implementations, the machine learning model 130 can be trained to predict whether there is an electrical grid asset at a specified location, and whether the specified location was an accurate specified location. For example, if the machine learning model 130 determines that there is an electrical grid asset at the specified location, the machine learning model 130 can also determine that the specified location was an accurate location. If the machine learning model 130 determines that there is no electrical grid asset at the specified location, the machine learning model 130 can also determine that the specified location was not an accurate location.

The system 500 provides the unlabeled training data 504 as input to the machine learning model 130. The machine learning model 130 receives as input a set of images. The machine learning model 130 generates a training output 552 that identifies whether the same electrical grid asset was identified in each image in the input set of images. For example, the training output 552 can include the input images labeled with the predicted geographic coordinates for the same electrical grid asset visible in the input images. The training output 552 can also include the input images without any labels, if the machine learning model 130 does not identify the same electrical grid asset in the set of images.

In implementations where the machine learning model 130 is a multi-class classifier, the training output 552 can include locations for predicted electrical grid assets with the highest confidence scores out of candidate electrical grid assets. For example, the machine learning model 130 can propose multiple candidate bounding boxes for the input images and associate each candidate bounding box with a class label of the type of electrical grid asset. The machine learning model 130 can select the candidate bounding boxes with the highest confidence scores to include in the training output 552.

The system 500 can adjust the parameters of the machine learning model 130 based on the outputs from the machine learning model 130. The evaluator 560 can compare the training output 552 to the labeled training data 502. The evaluator 560 can determine an error 562 between the training output 552 and the labeled training data 502. For example, the error 562 can be an error in the predicted geographic coordinates for an electrical grid asset in training output 552. The error 562 can also be an identified electrical grid asset in the training output 552 that does not exist in labeled training data 502. The error 562 can also be a missing identified electrical grid asset in the training output 552 that exists in labeled training data 502.

The system 500 can use the adjuster 570 to adjust the parameters of the machine learning model 130 based on the error 562. For example, the adjuster 570 can provide adjusted model parameters 580 for the machine learning model 130. Model parameters can include, for example, configuration variables, neural network weights, support vectors, and coefficients of the machine learning model. By adjusting the model parameters based on the error 562, the machine learning model 130 can be trained to more accurately detect and identify electrical grid assets in images.

FIG. 6 illustrates example overhead, oblique, and ground-level images of electric poles. Images 600, 610, and 620 depict electric poles 602 and 604 at a time of year, for example, when a tree located in between the electric poles 602 and 604 has leaves (e.g., in the summer). Images 650, 660, and 670 depict electric poles 602 and 604 at a time of year, for example, when the tree does not have any leaves (e.g., in the winter). Providing both of these sets of images as training inputs to the machine learning model 130, as described above in FIG. 5, can make the machine learning model 130 more robust to images taken in different conditions. Providing a larger amount of training inputs to the machine learning model 130 can also make the machine learning model 130 more accurate. For example, by providing training inputs with images of the same locations at different times of year, the machine learning model 130 can use a larger variety of visual clues, such as background characteristics of the area surrounding the electric pole at different times of year, and visual features such as characteristics of the electric pole at different times of year. As described above, when the machine learning model 130 is used to identify electrical grid assets, such as in a detection process, the machine learning model 130 can receive a set of images of the same location. The set of images may depict a location at any time of year. In some instances, the images within the set of images may depict the location at different times of year. Because the machine learning model 130 has been trained on training inputs that depict the same location at different times of year, the machine learning model 130 can more accurately identify and use the visual clues in the set of images to identify any electrical grid assets depicted in the set of images.

Figure 7:
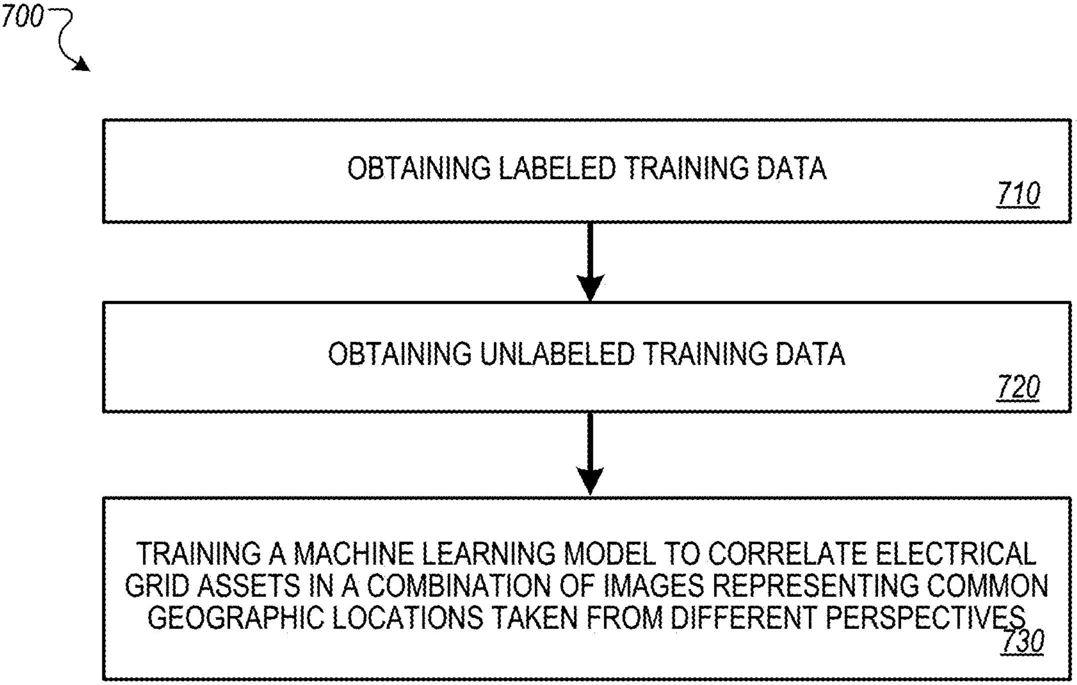
FIG. 7 is a flowchart of an example process for training a machine learning model to identify electrical grid assets.

FIG. 7 is a flowchart of an example process 700 for training a machine learning model to identify electrical grid assets. The process 700 can be performed by one or more computing systems including, but not limited to, the system 500 described above, for training a machine learning model to identify electrical grid assets. Electrical grid assets can include, for example, electric poles, power towers, or components on electric poles or power towers.

The system obtains labeled training data (710). The labeled training data can include sets of images, and each set can include at least one image from a first perspective, at least one image from a second perspective, and at least one image from a third perspective. For example, the first perspective can be an overhead perspective, the second perspective can be an oblique perspective, and the third perspective can be a ground-level perspective. Example images from an overhead perspective, oblique perspective, and ground-level perspective are shown in FIGS. 2A-2C. Each image in each set of images can include a label indicating whether an electrical grid asset is present in the image. For example, the label can indicate a location such as the geographic coordinates of the electrical grid asset. Each image in each set of images can be grouped based on representing a common geographic region.

The system obtains unlabeled training data (720). The unlabeled training data can include sets of images, and each set can include at least one image from the first perspective, at least one image from the second perspective, and at least one image from the third perspective. For example, the first perspective can be an overhead perspective, the second perspective can be an oblique perspective, and the third perspective can be a ground-level perspective. Example images from an overhead perspective, oblique perspective, and ground-level perspective are shown in FIGS. 2A-2C. Each image in each set of images can be grouped based on representing a common geographic region. The unlabeled training data can include unlabeled versions of a subset of the images from the labeled training data.

In some implementations, at least two of the sets of images of the labeled training data or the unlabeled training data each comprise images representing a same geographic region but taken in different seasons or different weather conditions. For example, FIG. 6 shows an example of two sets of images of the same electric poles, taken at different times of the year.

In some implementations, at least one image, e.g., an image from the first perspective, an image from the second perspective, or an image from the third perspective, can be omitted from at least one of the sets of images of the labeled training data. That is, in some implementations, at least one image from the overhead, oblique, or ground-level perspective is omitted from at least one of the set of images of the training data. In some implementations, at least one image from the first, second, or third perspectives is omitted from at least one of the sets of images of the unlabeled training data. The omission of an image from a different perspective can make the machine learning model more robust to missing data. For example, the system can remove images of a particular type or types from a set of training data. For example, the system can remove images from the second perspective from a set of training data. Thus, in some implementations, the labeled training data and unlabeled training data can each include a matrix of training images. Each matrix of training images can include multiple rows of training data for each electrical grid asset. Each row can include a different combination of images from the first, second, or third perspectives.

In some implementations, each image can be labeled with indications that distinguish at least one electrical grid asset and link the at least one electrical grid asset among the images in each set of images. For example, each image can be labeled with the geographic coordinates of different electrical grid assets. In some examples, different electrical grid assets may have the same geographic coordinates, such as a component located on an electric pole and the electric pole. Each image can thus be labeled with the geographic coordinates and/or a unique identifier for the different electrical grid assets. As another example, each image can be labeled with bounding boxes for each electrical grid asset and/or textual classes. A bounding box can mark the boundary of an asset in a rectangle. A textual class can indicate a type of electrical grid asset, such as power pole, transformer, cross arm, etc.

The system trains a machine learning model to correlate electrical grid assets in a combination of images representing common geographic locations taken from different perspectives (730). For example, the different perspectives can include overhead, oblique, or ground-level perspectives. The training, as described above with reference to FIG. 5, can include applying the unlabeled training data and the labeled training data as training input to the machine learning model. The system can train the machine learning model to identify the same electrical grid asset using visual clues depicted in the images, for example.

In some implementations, the machine learning model can be trained to confirm that electrical grid assets are the same electrical grid assets, for example, where multiple electrical grid assets are visible in each image.

In some implementations, the labeled and unlabeled training data can also include sensor data for the region, and the machine learning model can be trained to identify electrical grid assets using images and sensor data.

Figure 8:
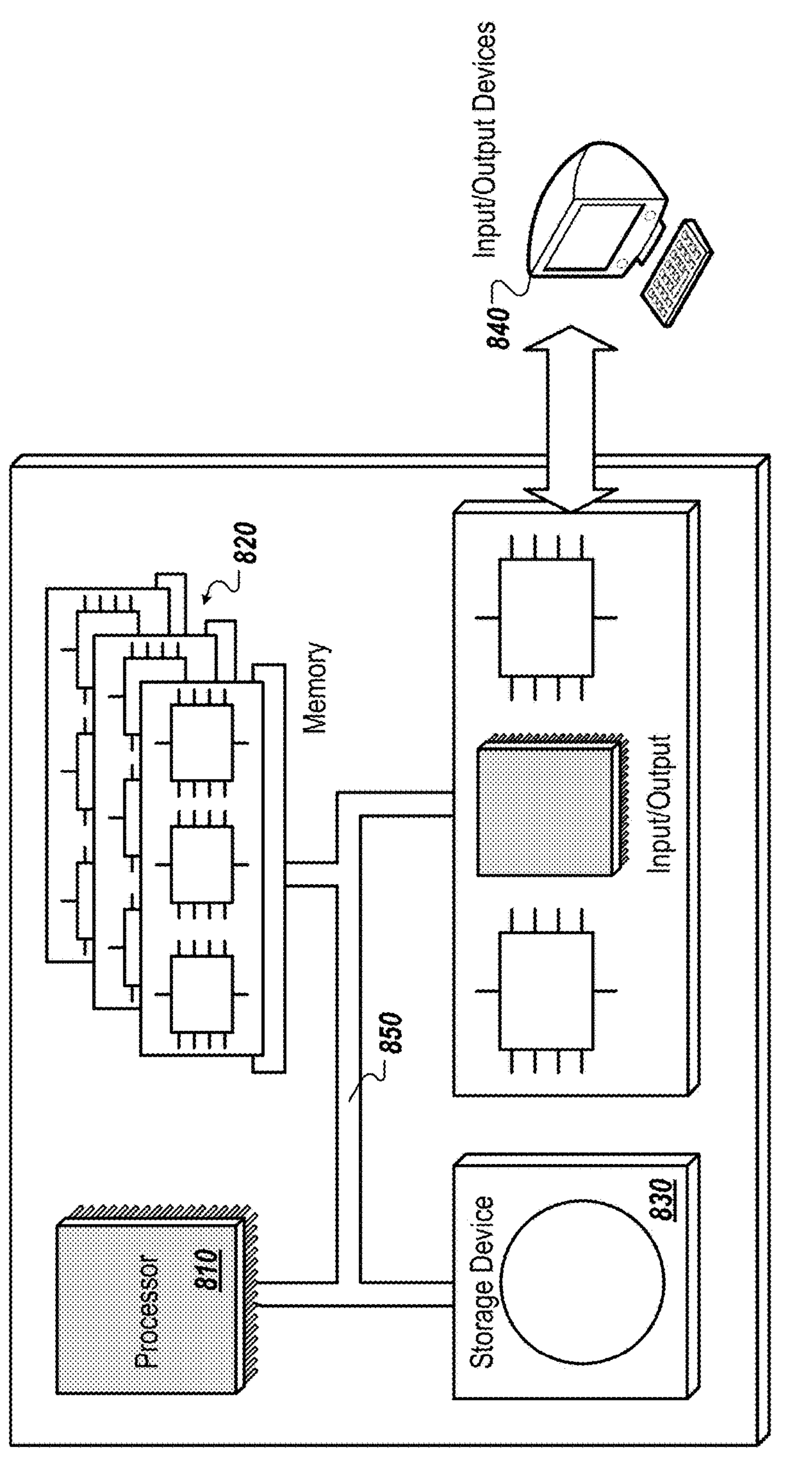
FIG. 8 depicts a schematic diagram of a computer system that may be applied to any of the computer-implemented methods and other techniques described herein.

FIG. 8 is a schematic diagram of a computer system 800. The system 800 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 800) and their structural equivalents, or in combinations of one or more of them. The system 800 is intended to include various forms of digital computers, such as laptops, desktops, workstations, personal digital assistants, servers, blade servers, mainframes, and other appropriate computers, including vehicles installed on base units or pod units of modular vehicles. The system 800 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method of training a machine learning model to identify electrical grid assets, the method comprising:

obtaining labeled training data comprising first sets of images, each first set of images comprising at least one image from a first perspective, at least one image from a second perspective, and at least one image from a third perspective, wherein each image in each first set of images comprises a label indicating whether an electrical grid asset is present in the image, and wherein images in each first set of images are grouped based on representing a common geographic region;

obtaining unlabeled training data comprising second sets of images, each second set of images comprising at least one image from the first perspective, at least one image from the second perspective, and at least one image from the third perspective, and wherein images in each second set of images are grouped based on representing a common geographic region, and wherein the labeled training data and the unlabeled training data each comprise a respective matrix of training images comprising multiple rows of training data for an electrical grid asset, each row comprising a different combination of images from the first, second, or third perspectives; and training a machine learning model to correlate electrical grid assets in a combination of images representing common geographic locations taken from different perspectives, the training comprising applying the unlabeled training data and the labeled training data as training input to the machine learning model.

2. The method of claim 1, wherein the first perspective is an overhead perspective, the second perspective is an oblique perspective, and the third perspective is a ground-level perspective.

3. The method of claim 1, wherein at least two of the first or second sets of images each comprise images representing a same geographic region but taken in different seasons or different weather conditions.

4. The method of claim 1, wherein the label indicates a location of a same electrical grid asset within each image within respective first sets of images, wherein some images in the labeled training data and the unlabeled training data comprise more than one electrical grid asset, and wherein the method further comprises training the machine learning model to distinguish between multiple electrical grid assets in each image.

5. The method of claim 1, wherein at least one image from the first, second, or third perspectives is omitted from at least one of the first sets of images.

6. The method of claim 1, wherein at least one image from the first, second, or third perspectives is omitted from at least one of the second sets of images.

7. The method of claim 1, wherein the electrical grid asset comprises any one of: electric poles, power towers, or components on electric poles or power towers.

8. An electrical grid mapping method comprising:

sampling multiple locations within a geographic region by obtaining a set of images of each location, each set of images comprising at least one image of the location from a first perspective, at least one image of the location from a second perspective, and at least one image of the location from a third perspective;

executing a detection process for each location, the detection process comprising applying the set of images for the location as input to a machine learning (ML) model that is trained to identify electrical grid assets depicted within images taken from a combination of different perspectives and obtaining a respective output for the location from the machine learning model that indicates whether a same electrical grid asset is identified in each of the images of the location;

in response to determining that the respective output for a particular location of the multiple locations indicates a positive identification of a same respective electrical grid asset being depicted in the set of images for the particular location:

selecting a number of sublocations adjacent to the particular location, wherein each sublocation covers a different area of the geographic region than the particular location; and executing the detection process for each sublocation.

9. The method of claim 8, wherein the electrical grid asset comprises any one of: electric poles, power towers, or components on electric poles or power towers.

10. The method of claim 8, further comprising determining a search vector along which the number of sublocations are selected.

11. The method of claim 10, wherein determining the search vector comprises:

selecting first sublocations within a predefined radius of the particular location;

executing the detection process for each one of the first sublocations and obtaining a set of ML outputs corresponding to the first sublocations; and determining the search vector along a direction extending from the particular location towards, and past, at least one of the first sublocations whose respective ML output indicated a positive detection.

12. The method of claim 11, further comprising executing the detection process for second sublocations along the search vector to obtain a second set of ML outputs corresponding to the second sublocations.

13. The method of claim 12, further comprising responsive to an ML output for one of the second sublocations indicating a negative detection result:

selecting third sublocations within a predefined radius of another one of the second sublocations, where an ML output for the other one of the second sublocations indicated a positive detection result;

executing the detection process for each one of the third sublocations and obtaining a third set of ML outputs corresponding to the third sublocations; and determining the search vector along a direction extending from the other one of the second sublocations towards, and past, at least one of the third sublocations whose respective ML output indicated a positive detection.

14. A system comprising:

at least one processor; and a data store coupled to the at least one processor having instructions stored thereon which, when executed by the at least one processor, causes the at least one processor to perform operations comprising:

sampling multiple locations within a geographic region by obtaining a set of images of each location, each set of images comprising at least one image of the location from a first perspective, at least one image of the location from a second perspective, and at least one image of the location from a third perspective;

executing a detection process for each location, the detection process comprising applying the set of images for the location as input to a machine learning (ML) model that is trained to identify electrical grid assets depicted within images taken from a combination of different perspectives and obtaining a respective output for the location from the machine learning model that indicates whether a same electrical grid asset is identified in each of the images of the location;

in response to determining that the respective output for a particular location of the multiple locations indicates a positive identification of a same respective electrical grid asset being depicted in the set of images for the particular location:

selecting a number of sublocations adjacent to the particular location, wherein each sublocation covers a different area of the geographic region than the particular location; and executing the detection process for each sublocation.

15. The system of claim 14, wherein the electrical grid asset comprises any one of: electric poles, power towers, or components on electric poles or power towers.

16. The system of claim 14, further comprising determining a search vector along which the number of sublocations are selected.

17. The system of claim 16, wherein determining the search vector comprises:

selecting first sublocations within a predefined radius of the particular location;

executing the detection process for each one of the first sublocations and obtaining a set of ML outputs corresponding to the first sublocations; and determining the search vector along a direction extending from the particular location towards, and past, at least one of the first sublocations whose respective ML output indicated a positive detection.

18. The system of claim 17, further comprising executing the detection process for second sublocations along the search vector to obtain a second set of ML outputs corresponding to the second sublocations.

19. The system of claim 18, further comprising responsive to an ML output for one of the second sublocations indicating a negative detection result:

selecting third sublocations within a predefined radius of another one of the second sublocations, where an ML output for the other one of the second sublocations indicated a positive detection result;

executing the detection process for each one of the third sublocations and obtaining a third set of ML outputs corresponding to the third sublocations; and determining the search vector along a direction extending from the other one of the second sublocations towards, and past, at least one of the third sublocations whose respective ML output indicated a positive detection.

* * * * *